United States Patent [19]

Brandenberg et al.

[11] Patent Number: 4,614,405

[45] Date of Patent: Sep. 30, 1986

[54] WIDE ANGLE LASER WINDOW

[75] Inventors: Werner M. Brandenberg; Denis J. Pistoresi, both of Seattle, Wash.

[73] Assignee: The Boeing Company, Seattle, Wash.

[21] Appl. No.: 425,457

[22] Filed: Sep. 28, 1982

[51] Int. Cl.[4] .......................... G02B 5/06; G02B 3/12
[52] U.S. Cl. .................... 350/286; 350/418; 350/484
[58] Field of Search .............. 350/418, 419, 286, 484; 354/79; 89/41 E, 41 EA

[56] References Cited

U.S. PATENT DOCUMENTS

| | | |
|---|---|---|
| 2,836,101 | 5/1958 | De Swart . |
| 3,161,718 | 12/1964 | De Luca . |
| 3,212,420 | 10/1965 | De la Cierva ............ 350/484 |
| 3,337,287 | 8/1967 | Lessman . |
| 3,389,950 | 6/1968 | Harper . |
| 3,514,192 | 5/1970 | De la Cierva ............ 350/418 |
| 3,641,354 | 2/1972 | De Ment . |
| 4,289,379 | 9/1981 | Michelet . |

Primary Examiner—Bruce Y. Arnold
Assistant Examiner—William Propp
Attorney, Agent, or Firm—Hughes & Cassidy

[57] ABSTRACT

A wide angle laser window for directing a coherent radiation beam through the skin of an aircraft to or from a distant point located at a varying azimuthal position with respect thereto is comprised of a fluid prismatic window including a first beam-transmissive window panel disposed aerodynamically with respect to the skin of the aircraft, a second beam-transmissive window panel disposed inwardly proximate the first in pivotable relationship therewith, a flexible seal securing the panels to define a fluid cell therebetween, and a beam-transmissive fluid charged to the cell; wherein the indices of refraction for each of the panel members and the fluid are matched to yield a variable angle prism having substantially uniform optical properties. A laser system incorporating a plurality of the aforesaid windows located circumferentially about an aircraft permits beam steering over a wide range of angles substantially enveloping the craft.

20 Claims, 7 Drawing Figures

WIDE ANGLE LASER WINDOW

BACKGROUND OF THE INVENTION

1. Field of the Invention

The present invention relates, generally, to laser pointing systems, more especially to wide angle laser windows for pointing a coherent radiation beam, and most particularly to such a window for directing a laser beam through the skin of an aircraft whether in a transmission or reception mode.

2. Description of the Background Art

Laser devices find wide ranging utility on board an aircraft. The same might be employed as a primary weapon system, where a relatively high power device is required to transmit its coherent radiation beam to a target destined for destruction. Lasers are adapted for ranging systems, requiring the transmission of the radiation beam to a specific target and then the reception and processing of a reflection therefrom. Yet another mode of operation includes tracking or homing from a distant point, where reception within the aircraft of a beacon signal is of paramount interest. Regardless of the specific intended utility for the laser system, the coherent radiation beam must pass through the skin of the craft; outwardly, inwardly, or both depending upon the objective. And too, the azimuthal position of either the target or the source of radiation (depending upon the mode of operation) typically may vary during the course of flight; making very desirable the ability to maintain a steady course irrespective of those variations as opposed to the need for course changes to present the distant point at a convenient location vis-a-vis the craft.

The problem of propagating a laser beam inwardly or outwardly from an aircraft is easy to articulate but elusive to solve. Heretofore a proposal to achieve this aim was the inclusion of a turret projecting outwardly of the aircraft and rotatably displaceable with respect thereto. Placing the laser optics within such a turret permits beam pointing to a distant location. However, the associated turbulence created by the projection of the turret into the airstream aft of its location on the craft has virtually eliminated the ability to transmit or receive a laser beam in a rearward aspect with respect thereto. This has led to the need for development of an efficient alternative to a turret or other device which projects into the airstream and thereby presents a non-aerodynamic surface.

The solution proposed by the present invention is one which adapts to good utility in the context aforesaid the basic concept of a liquid prism. Liquid prisms, per se, are known in the prior art for various purposes. In capsule sum, however, none of the known devices is configured for steering a laser beam, let alone one which must pass through the skin of an aircraft.

U.S. Pat. No. 3,337,287 generally typifies one type of fluid lens system of the prior art. The device disclosed in that patent is associated with a projection system for films where the image of a motion picture must be fixed on a screen. One of the principal objectives is to minimize deflection of the projected image arising, inter alia, from wear or change in the film, vibration or external forces, or the like. The proposal to resolution of that problem is the use of a variable angle prism in the form of a fluid-filled cell having a pair of aligned, pivotally mounted windows responsive to movement through a servo system. Distention of the prism components permits for small, angular variation in the transmission path of projected light, thereby stabilizing the incoherent image beam projected to a screen.

Another type of fluid lens is disclosed in U.S. Pat. No. 3,161,718 where an objective, in part, is to replicate the manner in which the human eye focuses. Numerous variable power fluid lens configurations are suggested, where the lens elements themselves include planar, convex and concave geometries or various combinations thereof. A liquid, or even a suitable gas, having proper optical characteristics, including glycerine and gelatin, is charged to a fluid chamber in the optical path of the lens system. A tensioning device controls a diaphragm in order to achieve desirable focusing effects. Conceptually similar to the '718 patent is U.S. Pat. No. 2,836,101 which likewise provides means for producing a variable focal length lens for incoherent light. Neither of these devices, nor those similar thereto, strictly involves beam steering of any sort, let alone the steering of a coherent beam of radiation.

A fiber optics scanning system is disclosed in U.S. Pat. No. 3,389,950. The device includes a type of spherical lens system intermediate closely mated optical surfaces. A liquid is employed to reduce the reflection between the two optical surfaces. Although the system includes what might be deemed a variable angle prism, it essentially is in the nature of a solid prism; the presence of a fluid to the contrary notwithstanding.

U.S. Pat. No. 4,289,379 discloses another variety of a variable focal length lens including a fluid medium within the optical path. It is noteworthy insofar as it includes a piezoelectric element which modifies the curvature of the lens in response to an input voltage. For still another type of variable focal length lens system, attention is invited to U.S. Pat. No. 3,641,354.

Quite a number of other patented devices of the foregoing ilk appear in the art. While each undoubtedly provides its own respective advantage within its intended field of use, none suggests or discloses a beam steering apparatus for laser pointing. In further point of fact, none discloses or suggests a beam steering system capable of replacing those associated with aircraft in a manner overcoming the undesirable non-aerodymanic projection of, e.g., a turret. Accordingly, the need exists to adapt the general concept of fluid lenses to a specific structural implementation, converting the same to a fluid prismatic window which will efficiently and reliably achieve the goal of a wide angle airborne laser window.

SUMMARY OF THE INVENTION

The present invention advantageously provides an aerodynamic, wide angle laser window allowing for the transmission and/or reception of a coherent beam of radiation through the skin of an aircraft with minimal degration to the beam. The laser window of the present invention desirably achieves beam pointing over a wide range of angles, allowing for contact between an aircraft and a distant point target or source located at a varying azimuthal position with respect to the craft during flight. The present invention provides the further advantage of efficient beam steering in a manner which eliminates not only the problems associated with flow field density variation around conventional optical turrets, but the concomitant reduction of beam jittering associated therewith; thereby enhancing substantially the accuracy or resolution of the laser system, whether the same be employed as part of a weapon system, a ranging system, a communication system, or a homing system.

The foregoing, and other, advantages are realized in one aspect of the present invention by a wide angle laser window for directing a coherent radiation beam through the skin of an aircraft to or from a distant point located at a varying azimuthal position with respect thereto, comprising a fluid prismatic window including a first beam-transmissive window panel disposed in aerodynamic relationship with the skin of the aircraft, a second beam-transmissive window panel disposed inwardly proximate the first panel in pivotable relationship thereto, a flexible seal means securing the first and second window panels to define a fluid cell therebetween, and a beam-transmissive fluid charged to that cell; wherein the indices of refraction for each of the panels and the fluid are matched to provide generally isotropic optical properties for the window. Matching of the indices of refraction for the components of the window permits the same to operate optically as a unitary prismatic member capable of beam steering upon pivotal movement of the second panel; minimizing both reflectance and associated beam degradation. Manipulation of the second window panel is preferably achieved by a gimbal assembly allowing for independent motion in three orthogonal planes; in turn extending the useful angular coverage provided by the prismatic window.

The fluid comprising the beam-steering window is one selected with quite a number of physical and optical properties borne in mind. Principal characteristics of interest include absorption coefficient and index change (in respect of the fluence) characteristics of the composition; all with the objective of minimizing both general and localized perturbations within the fluid during propagation of a laser beam therethrough, which would otherwise give rise to beam degradation. Further along these lines, heat-exchange means such as cooling and recirculation means are provided for the fluid when associated with high power laser systems such as those utilized in weaponry.

In highly preferred specific implementations of the wide angle laser window of the present invention, coarse beam pointing is provided to present a laser beam at a variable angle of incidence with respect to the pivotal window panel, itself moveable with respect to the beam. Consequently, both coarse and fine beam pointing may be achieved. In another highly preferred embodiment, a plurality of like wide angle laser windows are disposed about the circumferential periphery of the aircraft permitting a single laser system to operate selectively through one or another and thereby further expand the angular sighting range.

The foregoing and other advantages of the present invention will become more apparent, and a fuller appreciation of its structure and mode of operation will be gained, upon an examination of the following detailed description of the invention, taken in conjunction with the figures of drawing, wherein:

DETAILED DESCRIPTION OF THE INVENTION

The present invention relates, generally, to laser pointing systems, more especially to a laser pointing system for transmitting a coherent laser beam through the skin of an aircraft, and most particularly to such a system whereby vastly improved azimuthal coverage is achieved. A principal objective of the present invention is to propagate the laser beam with minimal degradation between a point within and another without the aircraft; such as degradation associated with flow field separation due to the projection of a turret-like device into the airstream of the craft. Accordingly, the present invention will now be described with reference to certain preferred embodiments within the aforementioned context; albeit, those skilled in the art will appreciate that such a description is meant to be exemplary only and should not be deemed limitative either of the scope of the particular embodiments or the intended field of utility. For example, it is envisioned that the basic principles and structure set forth herein might be adapted for the transmission and/or reception of a laser beam to and/or from a submerged vessel; as the same types of turbulent flow and concomitant beam degradation are likely to be experienced in that environment.

Figure 1:
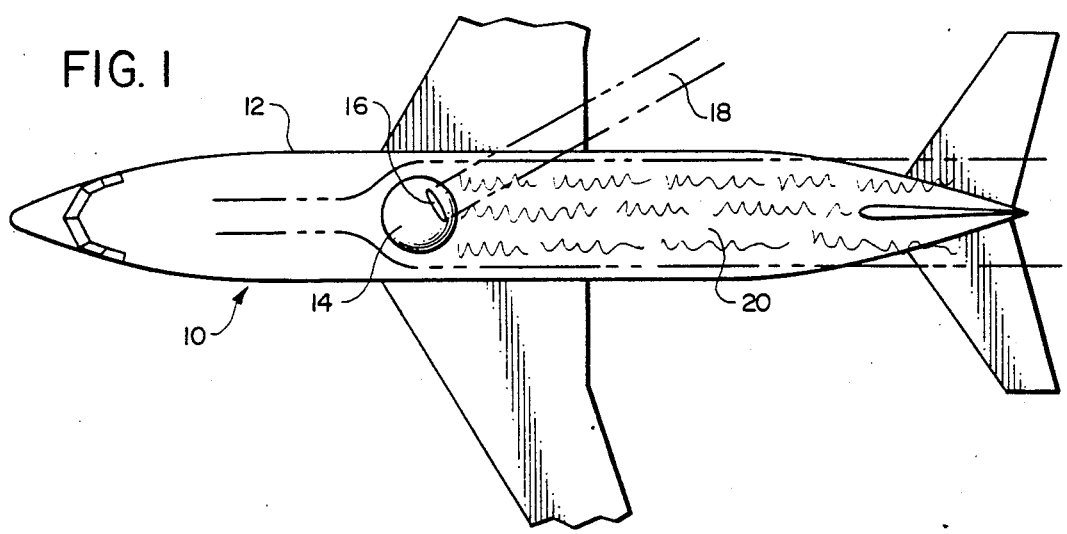
FIG. 1 is a fragmentary, top plan view of an aircraft having an optical turret projecting outwardly therefrom for the purposes of pointing a laser beam, showing the turbulence associated with such an approach.

Turning now to the figures of drawings, in all of which like parts are identified with like reference characters, FIG. 1 illustrates a heretofore perplexing problem respecting the propagation of a laser beam from an airborne platform. An aircraft designated generally as 10 having an aerodynamic skin 12 is provided with an upwardly projecting turret 14 with a laser window 16 disposed therein. The turret is free to rotate about an axis normal to the top surface of the craft 10 in order to sight about the same during flight; with due consideration for the upward projection of tail structure. A beam 18 is shown to be propagating outwardly from the turret 14 through the window 16. Propagation of the beam 18 to a distant target must be accomplished with minimum degration to assure maximum brightness at the focal spot. And, this is true irrespective of the azimuthal location of that target vis-a-vis the aircraft 10; the relative angular positions perhaps varying widely during the course of flight.

The projection of the turret 14 beyond the aerodynamic surface of the aircraft 10 results in turbulent flow aft of the turret, in a zone designated generally as 20. Beam degration occurs in the vicinity of the turret where the aircraft flow field structure and extent of separated, turbulent flow results in flow induced phase variance and flow induced mechanical jitter. These, in turn, constitute major contributions to far-field intensity losses due to beam propagation through a separated, uncontrolled flow region aft of the turret thus severely limiting the capability of, e.g., a laser damage delivery weapon toward the rear of the aircraft platform. More specifically, turbulence in the zone 20 manifests itself as density variations in the air through which the beam 18 is to be propagated. These variations, albeit small, give rise to path variations for the beam. In other words, one portion of the beam is propagated a different distance as compared with another portion as determined by the integrated density along the path. Such differences tend to make the beam become incoherent leading to degradation. Then too, temperature changes resulting from turbulence will have a like effect. The end result may be viewed as a change in the index of refraction of the gas over the course of propagation through the turbulent zone. These problems become all the more significant as the wavelength of the laser becomes shorter since the gradients giving rise to degradation have more pronounced effects comparing the variation over the distance the wave has travelled to its wavelength—as wavelength is reduced, smaller density variations due to turbulence become more accentuated. Buffet forces on the optical turret also contribute to degradation, and this contribution cannot be underestimated. These buffet forces due to the projection of the turret within the airstream cause or can contribute to significant vibration. Jitter in both the laser assembly and the optical window of the turret can become substantial contributors to far field intensity loss.

Figure 2:
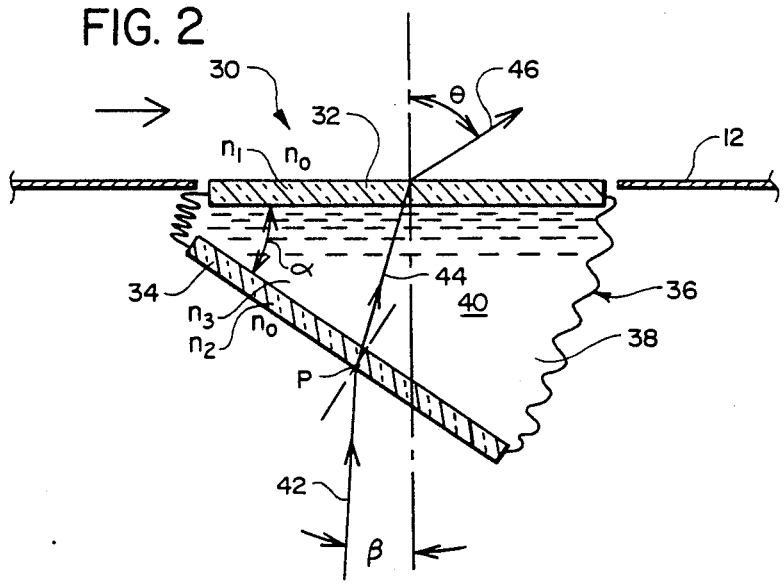
FIG. 2 is an illustration of the basic components of a wide angle laser window in accordance with the present invention, showing the angular relationships among the incident and output beams as well as the effect of window components thereon.

FIG. 2 illustrates a wide angle laser window, designated generally as 30, which not only overcomes the aforenoted problems associated with optical turrets, but provides in its own right the ability to achieve wide angle beam pointing of a laser over a finely adjustable range with minimal beam degradation. In this preferred embodiment, the laser window 30 is comprised of a first window panel 32 disposed aerodynamically with respect to the skin 12 of an aircraft. The window 32 is shown in this illustrative figure to be substantially flush with the skin 12, as this is the easiest way to maintain a good aerodynamic contour. A second window 34 is secured in pivotal relationship with respect to the window 32, about a central pivot point P. Preferably, the window 34 is associated with a gimbal assembly allowing for relative motion of the window in three orthogonal planes, as described more fully hereinbelow. The two window members 32 and 34 are sealed by a flexible seal means 36, such as a simple bellows or the like. Accordingly, a fluid cell 38 is defined intermediate the two window panels, circumscribed by the seal means 36. Fluid 40 is charged to the cell 38 to complete the basic components of the window structure itself. In operation, the laser window 30 may be viewed as a variable angle prism through which a laser beam 42 may be transmitted, subject to refraction as dictated by the window components.

The window components themselves are selected with an eye toward the use of material which will achieve two generally interrelated objectives. First, the window materials should be chosen to have minimal adverse effect on the transmissibility or propagation of the laser beam through the device. Thus, for example, the selection of materials should be made with due consideration for the absorption coefficients thereof at the wavelength of the laser beam to be propagated therethrough. Second, the components should be selected to match as closely as possible the respective indices of refraction to minimize the reflectance at one of the liquid/panel interfaces. While suitable candidates are considered in further detail below, those skilled in the art will appreciate at this juncture that the compositions for the components of the laser window may vary widely, and indeed will do so from application to application as a function of such parameters as wavelength and power. For example, absorption coefficients are sensitive to the wavelength in a way making some material more or less suitable for a given application than others, due to differences in the type of laser employed. In like vein, certain materials have thermal characteristics and correlative optical properties which vary over a temperature range making some compositions more or less suitable for high power laser applications than low power ones. Hence, a specific identification of suitable compositions is not realistically achievable due to the wide range of variables involved; and indeed, even the fixing of precise parameters (apart from a qualitative description) does not admit of specific precision due to the vagaries among laser applications for which the instant window has good utility. The foregoing to the contrary notwithstanding, those skilled in the art will have little difficulty in the selection of suitable panel and liquid compositions guide by the principles set forth herein.

Optimally, with an index of refraction $n_o$ for air conventionally being taken as 1, each of the windows 32 and 34 as well as the fluid 40 will have an identical index of refraction $n_i$. In practice, such *identical* matching may well be an impossible goal to reach. Window materials for the outer window 32 must be capable of withstanding for environment external to the aircraft and the extremes experienced over flight conditions; both in respect of stress and temperatures variations. The same constraints do not apply to the window 34, although it is important to match the indices of the two windows as closely as possible and the easiest approach is simply using identical compositions. While the matching of the window components in terms of the index of refraction is easily achieved in that manner, the selection of a fluid 40 will normally require some compromise in terms of index matching. In general, for a window 32 having an index of refraction $n_1$, a window 34 having an index of refraction $n_2$, and a fluid having an index of refraction $n_3$, it is preferred that $n_1$ and $n_2$ be equal or nearly so while $n_3$ differ from those by a value of less than about $\pm 10\%$, and more preferably by about $\pm 5\%$; striving nonetheless for a match as close as possible. By appropriate selection of materials, it is currently fairly easy (consistent with conventional optics) to achieve a matching of the indices of refraction for these three components to yield a reflectance at the liquid/panel interfaces of less than about 0.2%, in most cases about 0.01% and, in some specific embodiments of the present invention, about 0.005%. For example, refractive indices for suitable panels vary from about 1.5 for glass to about 1.42 for calcium fluoride windows. Many suitable liquids, such as chloroform with an index of refraction of 1.441 and carbon tetrachloride with an index of 1.454, closely match panel compositions within the most preferred range and permit a reduction of reflectance to within the aforenoted limits.

For purposes of the present discussion, it can be considered that the matching of the indices $n_i$ may be achieved within a close enough tolerance that for the balance of this description each of the window components will be considered to have a matched index $n_1$. The error introduced by this assumption may be viewed as negligible since the preferred reflectance limit noted above is less than about 5 parts in 10,000. Accordingly, the window 30 may be viewed very realistically as an optically homogeneous, variable angle prism with isotropic properties. With those thoughts in mind, FIG. 2 shows a beam being propagated from within the aircraft 10 along a propagation path 42 incident upon window 34 at an angle $\beta$ with respect to the normal to window 32. The beam is refracted at an angle in accordance with the index of refraction $n_1$ along a path 44. Matching of the indices as aforementioned implies virtually no reflectance or further refraction at the interface between the liquid 40 and either of the window panels 32 or 34. Accordingly, the path 44 is straight from the point of initial impingement on the outer surface of window 34 until it emerges at the outer surface of the window 32. At that point the index of refraction changes as the beam again propagates through the air, and it is refracted to emerge as an output beam 46 at an angle $\theta$ with respect to the normal to window 32. Variation in the angular displacement of the input beam 42 (as measured by the angle $\beta$) as well as the angular relationship between windows 32 and 34, (as measured by the angle $\alpha$ allows for a wide variation in the angular displacement of the output beam 46 (as measured by the angle $\theta$). From Snell's Law, the output angle $\theta$ is related to the variable angles $\alpha$ and $\beta$ in accordance with the relationship:

$$\sin\theta = \sin\alpha \left[ \frac{(n_1)^2}{n_o} - \sin^2(\alpha - \beta) \right]^{\frac{1}{2}} - \sin(\alpha - \beta)\cos\alpha.$$

Figures 3, 4, 5:
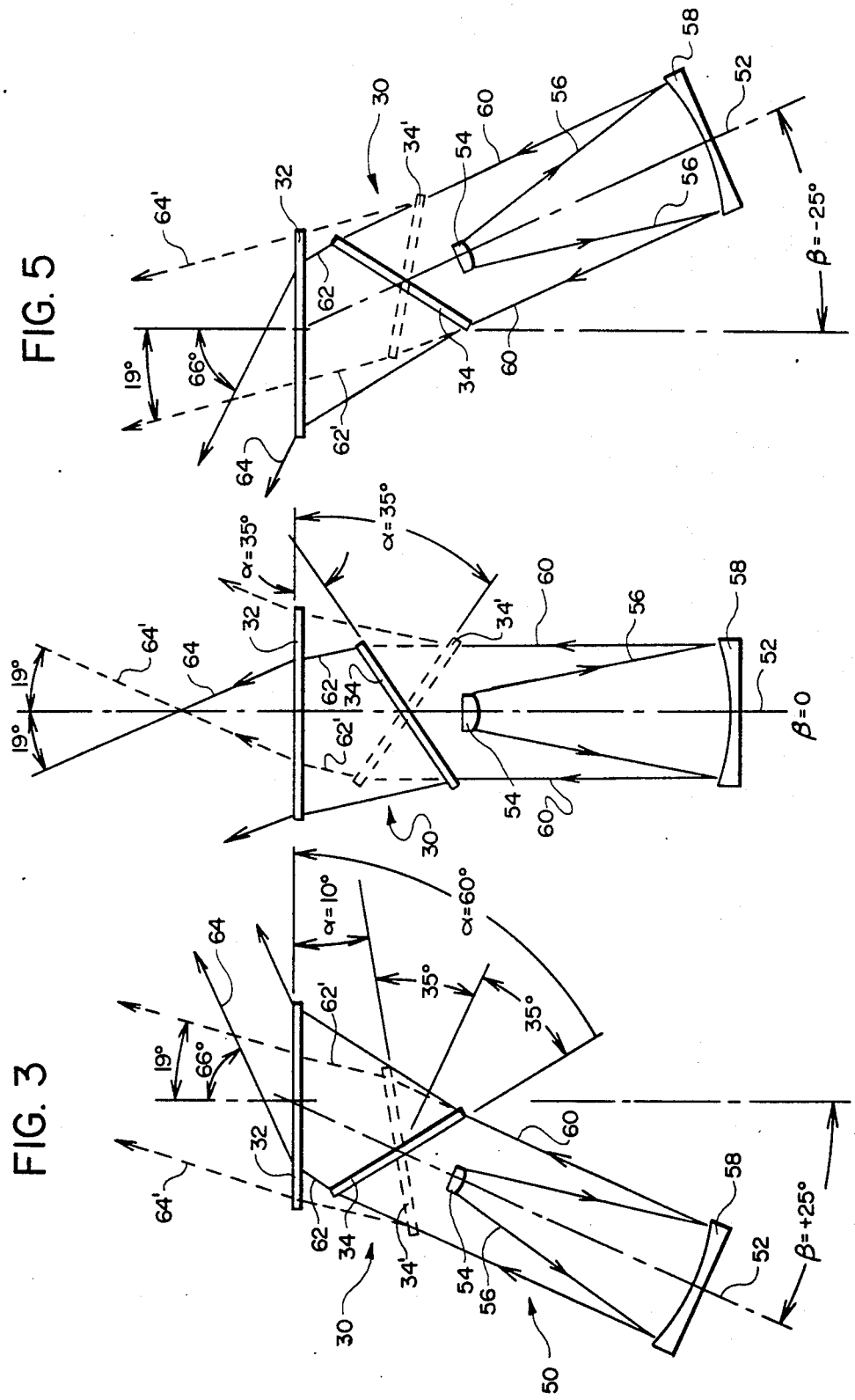
FIGS. 3-5 illustrate a variety of input and output beams, showing the manner in which both coarse and fine beam pointing are achievable by the wide angle laser window in accordance with the present invention.

Consequently, manipulation of the angles $\alpha$ and $\beta$ permits beam steering; and this is true whether the beam is propagating along the path shown in FIG. 2 (in a transmission mode) or along a reverse path (e.g., in a reception mode). FIGS. 3, 4 and 5 illustrate the wide variations achievable by simple movement of a laser assembly and independent movement of the laser window 30.

A beam expander assembly designated generally as 50 conventionally used to broaden the dimensions of a laser beam is shown in FIGS. 3-5 in cooperation with a laser window 30. Looking specifically to FIG. 3, a relatively narrow beam is propagated along a path 52 to a mirror 54 which reflects the beam rearwardly along the conically shaped path 56 to a reflector 58. The beam thence is transmitted forward along a path designated 60 to the laser window 30. All other things being equal, the beam incident upon the window 30 will have a circular cross-section dictated by the geometry of the reflector 58; a point considered in somewhat greater detail below. Comparing FIGS. 3-5, the angle of incidence of the beam along path 60 relative to the normal to window 32 (the angle $\beta$) is shown in three fixed positions; viz., +25° in FIG. 3, 0° in FIG. 4, and −25° in FIG. 5. In each of these figures, the pivotal window 34 is shown in two configurations, one in solid lines and one in phantom lines; the variation being ±35°. The output beam angles are correlated with the variation in the window 34; wherein the solid lines for the output beam correspond to the solid outline of the window and dashed lines correspond to the phantom position.

Turning directly then to FIG. 3, the beam along path 60 striking the pivotal panel 34 when in the configuration shown in full lines will refract along the path 62 through the laser window 30. Upon passing through the window, the beam will be refracted again at the interface between window 32 and the air and follow an output beam path 64 looking rearward of the craft. As shown in FIG. 3, the output angle $\theta$ in this case is 66° assuming a ratio of indices $n_1$ to $n_o$ of about 1.5. Moving the pivotal panel 34 to the position shown in phantom lines, the beam path 60 is now refracted along the line 62' through the window 30, emerging as an output beam along the path 64'. As is shown in FIG. 3, the output angle $\theta$ is now 19°. FIG. 4 shows the beam expander assembly 50 shifted 25° with the propagation path now lying normal to window 32. In this situation, as the pivotal panel 34 rotates ±35° as shown, the output beam angle $\theta$ varies over the range ±19° from the normal. FIG. 5 continues with a progression showing the beam expander shifted to the fixed position of −25° relative to the normal to window 32. The angular paths in FIG. 5 are identical to those in FIG. 3, save the output is now toward a forward aspect of the craft vice the aft aspect shown in FIG. 3. Consequently, FIGS. 3-5 collectively illustrate a variation in the output angle from 66° aft to 66° forward by simple coarse manipulation of the beam expander 50 and the appropriate orientation of the pivotal panel 34. Of course, these angular variations can be accomplished very smoothly by the control on the movement of window 34 over a continuously variable range. The advantage is multifold; particularly since the beam expander assembly 50 tends to be rather heavy while, on the contrary, the window 34 may be very easily moved over a continuously adjustable range. In this regard, the exemplary angular relationship shown in FIGS. 3-5 are set forth merely as illustrative of one range of variation to achieve this continuously adjustable feature; and there is no strict restriction on the range of angular variation for the window panel 34 excpet for the practical limit of window size. That is, as the window 34 is rotated to extremes, larger windows become necessary to accommodate the refracted beam.

Figure 6:
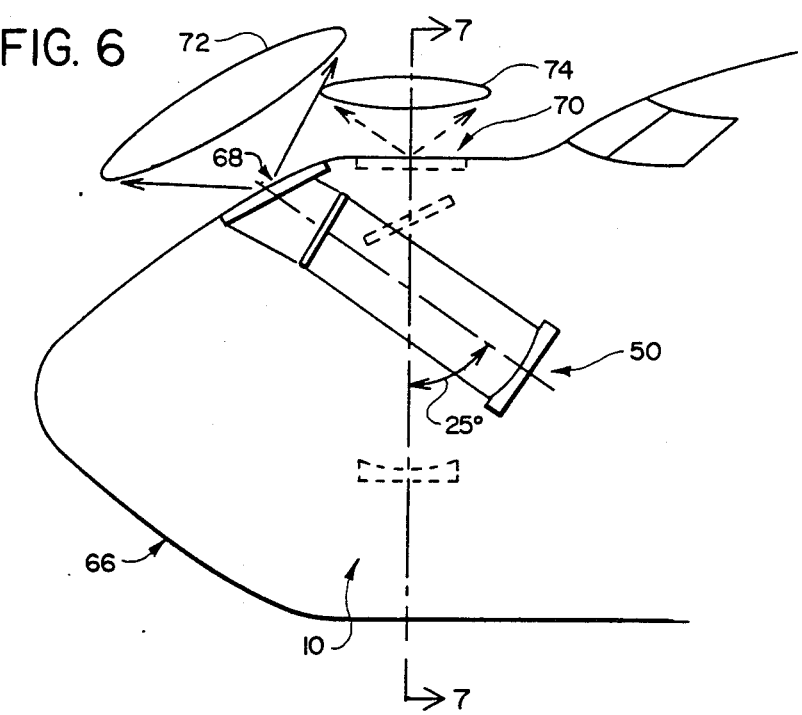
FIG. 6 is an illustrative, side elevational view of the nose of an aircraft having disposed therein a plurality of wide angle laser windows in accordance with the present invention, showing one pattern of angular coverage; and, FIG. 7 is an illustrative sectional view, taken substantially along the line 7—7 of FIG. 6, showing the manner in which angular coverage about the aircraft is achieved through the implementation of three wide angle laser windows in association with a single laser system.
Figure 7:
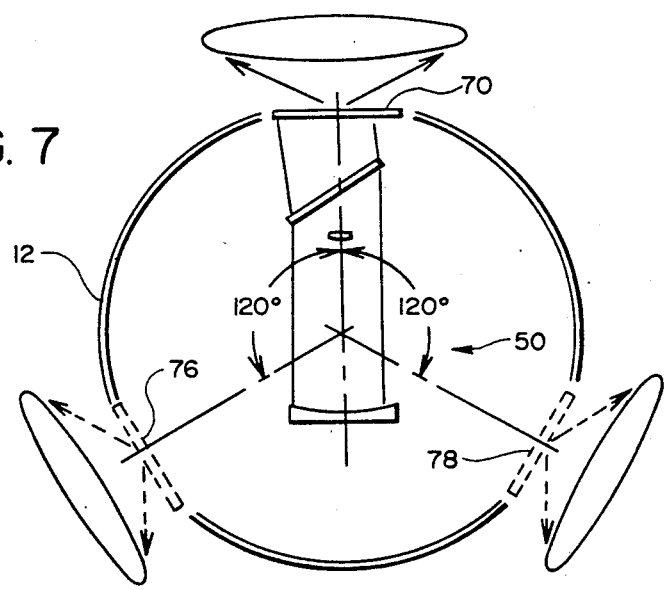

In a highly preferred structural embodiment of the present invention, the window 34 will be supported in a gimbal assembly allowing for movement in three orthogonal planes to achieve the fine beam pointing features while the beam expander will be positioned for displacement in somewhat greater incremental paths. However, it too may be secured within gimbal means to permit appropriate adjustment of the input beam 60 relative to window 30. FIGS. 6 and 7 show diagrammatically a manner in which a single beam expander 50 may be associated in this way with a plurality of windows 30 disposed circumferentially about the fuselage of an aircraft 10 in order to achieve broad azimuthal coverage substantially enveloping the aircraft.

FIGS. 6 and 7 show the nose cone area 66 of the aircraft 10 wherein a beam expander assembly 50 is disposed in gimballed relationship for movement in two planes. The beam expander is shown in FIG. 6 in cooperation with a first laser window 68 (in full lines) and a second laser window 70 (in phantom lines), where each of the windows 68 and 70 has the structure of the window 30 previously described. As can be seen, the window 68 is disposed along a leading edge of the sloped portion of the nose cone 66 while the window 70 lies along a top surface thereof. The beam expander 50 is free to pivot in an arc about an axis generally normal to the longitudinal axis of the aircraft, shown to be a 25° arc for illustrative purposes, in order to propagate a beam through either the window 68 or the window 70. When associated with one or the other, the respective pivotal window panel may then be adjusted as described in detail above to yield a beam pointed outwardly from the craft within the conical limits illustrated in the figures. That is, a beam propagating outwardly through the window 68 may be steered to an azimuthal point lying within the boundary of cone 72. Likewise, with the beam expander 50 pivoted to the phantom position for cooperation with window 70, the output beam may vary in its positioning within the confines of the conical surface 74.

Three sets of laser windows are disposed about the circumferential periphery of the nose cone 66 in this highly preferred embodiment, as shown in FIG. 7. Thus, windows 76 and 78 lie on the surface of the nose cone 66 along a path coincident with the window 70 and spaced equiangularly thereabout. Corresponding windows are provided at the same location vis-a-vis the orientation of window 68. Consequently, the beam expander 50 may be pivoted about a second axis either lying along the longitudinal axis of the aircraft or having a principal component along that axis, for registration with either of these other sets in order to achieve azimuthal coverage from those locations. The preferred embodiment shown in FIGS. 6 and 7 provides total spherical coverage about the aircraft 10, excluding an aft cone with a half angle of about 24°. This is in contradistinction to the turret approach restricting substantially any rearward-looking direction for angles in excess of about 90°; while eliminating the associated drawbacks of projecting a non-aerodynamic surface beyond the aircraft skin.

Irrespective of the precise structural implementation for the wide angle laser window 30 of the present invention, there are certain further considerations which warrant detailed comment. Among those of paramount interest are the optical and thermal properties of the window components eluded to above. The optical performance of the window 30 depends upon the thermally-induced distortion of the window panels and the index of refraction variations induced in the liquid during operation. Hence, the optical properties of the window depends upon absorption coefficient, specific heat, induced index change due to temperature change (dn/dT), turbulent eddy scale size, and heat removal rate as dictated by the flow velocity of the liquid between the panels. The Table below identifies important characteristics of likely fluid candidates, tabulating absorption coefficients for a 0.63 micron wavelength, index variation as a function of incident fluence (dn/dE) as well as refractive index for matching with the panel materials to achieve low reflection loss at the liquid interface.

TABLE

| Liquid Type | Refractive Index | Absorption Coefficient (cm$^{-1}$) | dn/dE (J/cm$^2$)$^{-1}$ |
|---|---|---|---|
| Benzene | 1.495 | $1.65 \times 10^{-4}$ | $2.96 \times 10^{-7}$ |
| Toluene | 1.492 | $5.94 \times 10^{-4}$ | $9.80 \times 10^{-7}$ |
| Chloroform | 1.441 | $0.825 \times 10^{-4}$ | $1.42 \times 10^{-7}$ |
| Carbon Tetrachloride | 1.454 | $0.9 \times 10^{-4}$ | $1.63 \times 10^{-7}$ |
| Water | 1.331 | $22.5 \times 10^{-4}$ | $1.8 \times 10^{-7}$ |

The foregoing parameters are important for the assessment of possible beam degradation. Beam degradation caused by laser energy absorption in the liquid manifests itself in two ways. First, large scale turbulence (on the order of the size of the laser beam) will cause beam jitter or large scale non-uniformity in laser intensity. Second, small scale turbulence, resulting from inhomogeneities of liquid turbulent eddies, will cause wide angle scattering of the beam. Assuming that the beam control system has the capability to correct tilt to better than 95%, a phase front degradation of up to about 2 waves across the full aperture of the window can be allowed. Beam steering mirrors in the beam control system are capable of correcting the pointing error to within an angular tolerance of about 0.1 $\lambda$/D, where $\lambda$ is the laser wavelength and D the beam diameter. Selecting a nominal size window aperture and chloroform as the liquid, it has been determined that average flow velocities of approximately 5 meters per second are required to remove the heat when a laser beam with an average intensity of 500 W/cm$^2$ passes through the wide angle laser window 30.

Based on wide angle scattering from turbulent eddy currents with a typical scale size equivalent to about 1/10th of the window separation distance (e.g., 15 centimeters), flow velocity requirements of 3 to 5 meters per second are estimated when the far field Strehl ratio is allowed to degrade from 1.0 to 0.9. These estimates are typical for visible wavelengths. If the laser wavelength is assumed to be 1.3 microns (typical of an iodine laser), the absorption coefficient of the liquid could be two times larger for similar optical degradation values identified above. If liquid absorption values at the longer wavelength tend to be higher, increased flow velocity and reduced turbulent scale size (using appropriate mixing technique) would have to be employed to minimize overall beam degradation.

Assuming that typical absorption coefficients lie in the general range set forth in the Table (i.e., $10^{-4}$ to $10^{-3}$ per centimeter) the average absorbed power will lie in the range of about 0.1 to about 1%. Laser runtimes on the order of several hundred seconds could be accommodated by the use of a moderate size thermal reservoir or recirculation cooler. Temperature uniformities in the liquid of about 0.1 to about 0.2° C. over typical dimensions of about 3 centimeters should be achieved; but this is easily accomplished with the conventional heat exchange devices noted above.

It will further be appreciated by those skilled in the art that the wide angle laser window 30 will tend to reduce or compress the beam in one plane as the window 34 is rotated. The diameter of the compressed beam leaving window 32 is proportional to cos $\theta$. Thus, at an angle $\theta$ of about 60°, the beam would be an oval with a 2/1 major/minor diameter ratio. At an angle $\theta$ of about 30°, the on-axis far field intensity would decrease by a factor of about 1.2. In order to counteract this reduction in far field intensity, the beam diameter entering window 34 is peferably oversized; something easily achieved by appropriate contour of the beam expander components.

The foregoing considerations have principal importance when the laser system cooperating with the wide angle window(s) 30 is transmitting a coherent radiation beam outwardly of the aircraft, with enhanced significance as the power increases to those levels implied by a weapon or damage delivery system. Nonetheless, many of the same considerations obtain when one focuses on low power transmission, or even simple reception of, e.g., a beacon signal propagated from a distant point. Although heating of the window components is not a likely problem in those arenas, absorption coefficients at the wavelength of the beam maintain a significant role in the efficiency of the device. The fluids noted in the Table are those which have been selected on the basis of overall performance characteristic, perhaps with a somewhat greater emphasis upon transmission of a high power laser beam. It has been learned that tabulated properties for absorption coefficient, index change, and the like are helpful in the initial evaluation of a likely fluid candidate insofar as such parameters will allow one to reject a given composition; but the selection of a material from a positive point of view is currently an empirical endeavor. Likewise, the need for cooling of the fluid and the specific design of a suitable heat-exchange system will vary from application to application. But, given the benefit of the structural and operational principles set forth herein, those skilled in the art will have no difficulty in determining those compositions for window components best suited to the problem at hand and the necessity of including heat-exchange means and an appropriate design as may be required by that particular system.

Thus, while the invention has now been described with reference to certain preferred embodiments, those skilled in the art will appreciate that various substitutions, modifications, changes and omissions may be made without departing from the spirit thereof. Accordingly, it is intended that the scope of the present invention be limited solely by that of the claims granted herein.

What is claimed is:

1. A wide angle laser window particularly adapted to be mounted to an aircraft to direct coherent radiation from the aircraft to a distant point or from the distant point to the aircraft along paths that vary angularly relative to the aircraft, wherein the aircraft has an outer skin portion defining an aerodynamically contoured aircraft surface, said window comprising:
    a. a first outer beam transmissive window panel which has an index of refraction of $n_1$ and which has an outer surface that is in an aerodynamically aligned position at the aerodynamically contoured aircraft surface so as to blend aerodynamically with said aircraft surface, said first panel being mounted to the aircraft in a manner that the outer surface of the first panel remains in its aerodynamically aligned position during operation of the window to direct or receive said radiation along paths of differing angularity of alignment,
    b. a second beam transmissive window panel having an index of refraction $n_2$ and positioned inwardly of, and in general alignment with, said first panel, said second panel being pivotally mounted relative to the first panel so as to be able to change its angular relationship relative to the first panel and thus change angle of alignment of a beam passing to or from said first panel,
    c. flexible seal means joining said first and second panels to define a fluid cell therebetween and to contain therein a beam transmissive fluid having an index of refraction $n_3$,
    d. said indices of refraction $n_1$, $n_2$ and $n_3$ being substantially matched for generally undegraded transmission of a continuous beam of coherent radiation across the skin of the aircraft.

2. The wide angle laser window of claim 1, wherein said indices are matched within about 10%.

3. The wide angle laser window of claim 2, wherein the indices $n_1$ and $n_2$ are substantially identical, and the index $n_3$ differs therefrom by less than about 5%.

4. The wide angle laser window of claim 2, wherein said indices are matched to maintain reflectance at a fluid/panel interface at less than about 0.2%.

5. The wide angle laser window of claim 4, wherein said indices are matched to maintain reflectance at a fluid/panel interface at less than about 0.01%.

6. The wide angle laser window of claim 5, wherein said indices are matched to maintain reflectance at a fluid/panel interface at least than about 0.005%.

7. The wide angle laser window of claim 1, further comprising heat exchange means in communication with said fluid cell for cooling said fluid.

8. The wide angle laser window of claim 1, 2, 3, 4, 5, 6 or 7, wherein said second window panel is received in gimbal means for pivoting same in three generally orthogonal planes.

9. In combination with the wide angle laser window of claim 8, a laser assembly for transmitting and/or receiving a coherent radiation beam along a propagation path through said laser window.

10. A laser pointing system for steering a coherent radiation beam along a propagation path through the skin of an aircraft to or from a distant point located at a varying azimuthal position with respect thereto, where the aircraft skin has an outer aerodynamically contoured surface, said system comprising:
    a. a laser assembly for transmitting and/or receiving a coherent radiation beam along said propagation path through the skin of the aircraft, and,
    b. at least one fluid prismatic laser window, said window comprising:
        (1) a first outer beam transmissive window panel which has an index of refraction of $n_1$ and which has an outer surface that is in an aerodynamically aligned position at the aerodynamically contoured aircraft surface so as to blend aerodynamically with said aircraft surface, said first panel being mounted to the aircraft in a manner that the outer surface of the first panel remains in its aerodynamically aligned position during operation of the window to direct or receive said radiation along paths of differing angularity of alignment,
        (2) a second beam transmissive window panel having an index of refraction $n_2$ and positioned inwardly of, and in general alignment with, said first panel, said second panel being pivotally mounted relative to the first panel so as to be able to change its angular relationship relative to the first panel and thus change angle of alignment of a beam passing to or from said first panel,
        (3) flexible seal means joining said first and second panels to define a fluid cell therebetween and to contain therein a beam transmissivle fluid having an index of refraction $n_3$,
        (4) said indices of refraction $n_1$, $n_2$, and $n_3$ being substantially matched for generally undegraded transmission of a continuous beam of coherent radiation across the skin of the aircraft.

11. The laser pointing system of claim 10, wherein said indices are matched within about 10%.

12. The laser pointing system of claim 11, wherein the indices $n_1$ and $n_2$ are substantially identical, and the index $n_3$ differs therefrom by less than about 5%.

13. The laser pointing system of claim 10, wherein said indices are matched to maintain reflectance at a fluid/panel interface at less than about 0.02%.

14. The laser pointing system of claim 13, wherein said indices are matched to maintain reflectance at a fluid/panel interface at less than about 0.01%.

15. The laser pointing system of claim 14, wherein said indices are matched to maintain reflectance at a fluid/panel interface at less than about 0.005%.

16. The laser pointing system of claim 10, further comprising laser window gimbal means for pivotal movement of said second panel in three generally orthogonal planes.

17. The laser pointing system of claim 16, further comprising laser assembly gimbal means for pivotal movement thereof with respect to said laser window.

18. The laser pointing system of claim 17, wherein said laser assembly is disposed for rotational displacement about a first axis having a major component along the longitudinal axis of said aircraft and arcuate displacement about a second axis generally normal to said first axis, said system further comprising a plurality of said laser windows disposed about the circumferential periphery of said aircraft along a path circumscribing the location of said laser assembly; whereby said laser assembly may be rotationally displaced about said first axis for selective cooperation with one of said laser windows for the transmission and/or reception of a coherent radiation beam therethrough.

19. The laser pointing system of claim 18, further comprising heat-exchange means in communication with said fluid cell(s) for cooling said fluid.

20. The laser pointing system of claim 10, further comprising heat-exchange means in communicatin with said fluid cell(s) for cooling said fluid.

* * * * *